United States Patent Office 3,351,785
Patented Nov. 7, 1967

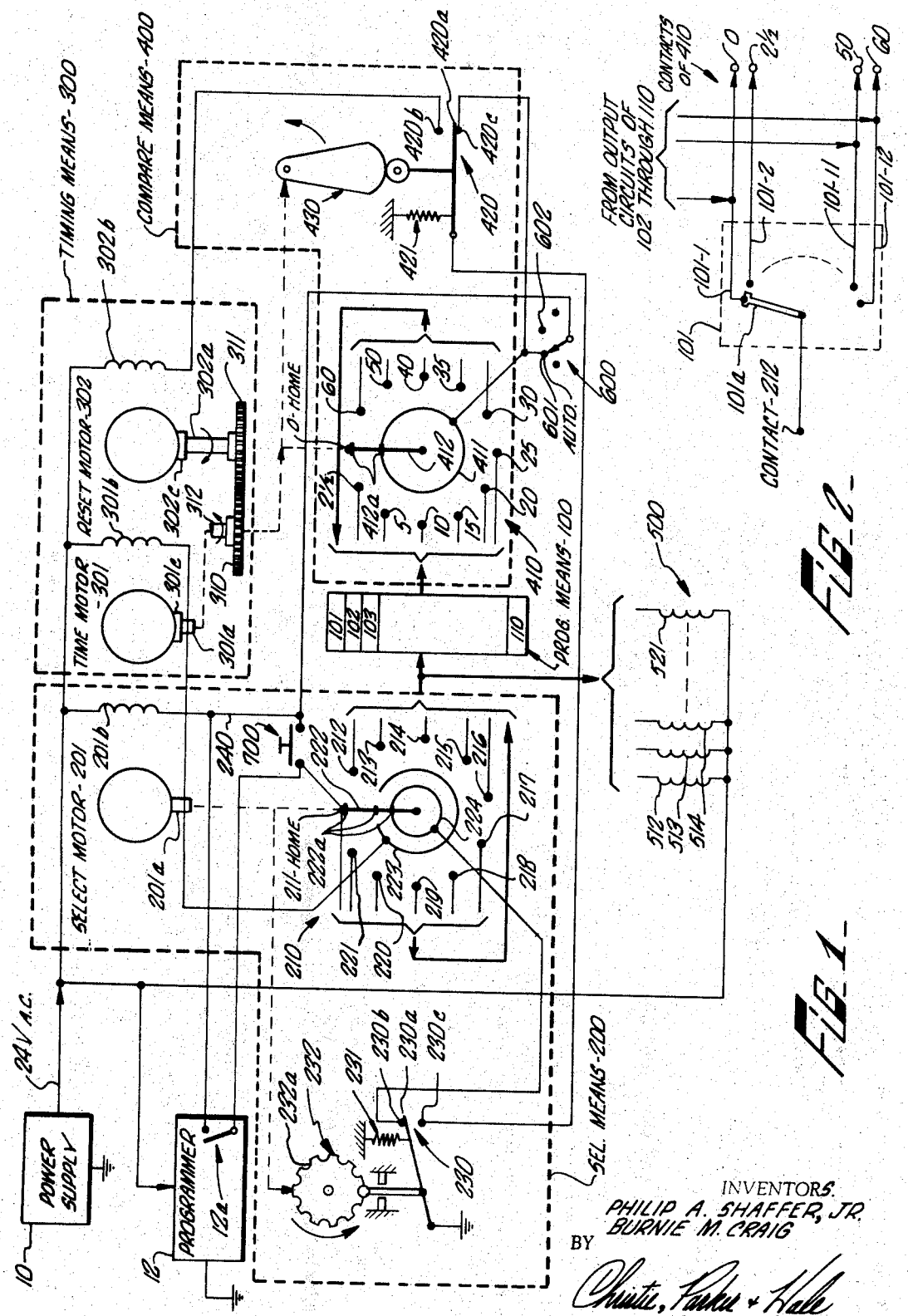

3,351,785
CONTROL APPARATUS
Burnie M. Craig and Philip A. Shaffer, Jr., Pasadena, Calif., assignors, by mesne assignments, to Campus Road Investment Company, Inc., a corporation of California
Filed June 15, 1964, Ser. No. 375,026
2 Claims. (Cl. 307—141)

This invention relates broadly to control apparatus and more particularly to an electrical control apparatus for automatic lawn sprinkling systems.

Automatic lawn sprinkling systems are generally known and have a controller for applying electrical signals to solenoid operated control valves. The controllers are arranged for applying the electrical signals to the solenoid valves sequentially, one by one, causing the valves to turn on the flow of water for the length of time the electrical signal is applied to the solenoid. A program device is provided in the controllers for determining the length of time an electrical signal is applied to the solenoid.

One type of prior art controller has a motor driven timer with a solenoid for returning the timer to an initial condition. This prior art controller suffers from the serious disadvantage that it is composed of specially manufactured and expensive components.

Electromechanical controllers are known. For example, one electromechanical controller has cams and mechanical linkage mechanisms for effecting control. The cams and mechanical linkage mechanisms are specially manufactured parts which are very expensive to manufacture and quite complicated. Another electromechanical controller contains a number of programming drums. The programming drum type controller is undesirable because it is extremely difficult to adjust.

The aforementioned disadvantages of the prior art are overcome in a system which embodies the present invention. The embodiment of the invention is characterized by its extreme simplicity and low cost of manufacture. Additionally, the circuit utilized lends itself for printed circuit construction, which further reduces the cost of manufacture. Additionally, a special cam actuated switch arrangement is provided for making and breaking a current carrying path to the solenoid valves.

The market for controllers for automatic lawn sprinkling systems is very competitive. A substantial reduction in cost of a controller, such as that afforded by the present invention, is of considerable importance, particularly where large quantities of controllers are to be manufactured.

Briefly, a control apparatus embodying the present invention comprises timing means for providing an indication of elapsed time including controllable reset control means for rapidly resetting the timing means to an initial condition. Selection means is provided having a plurality of output circuits at which control signals are applied. The selection means is coupled to the timing means and is operative for advancing the control signal from one output circuit thereof to the next in sequence concurrently with the resetting of the timing means. A programming means is coupled to the selection means and is operative in response to a control signal at each one of the output circuits for providing an indication of the time interval such control signal is to be applied. A compare means is coupled to be responsive to a coincidence of the elapsed time indicated by the programming means and the reset control means for causing the reset means to rapidly reset the timing means.

These and other aspects of the present invention may be more fully understood with reference to the following description of the drawings of which:

FIG. 1 is a schematic drawing showing a control apparatus and embodying the present invention; and FIG. 2 is a schematic diagram of one switching circuit of the programming means shown in the schematic diagram of FIG. 1.

Refer now to the schematic diagram of FIG. 1 which shows the details of a controller and embodies the present invention. In a preferred embodiment of the present invention, the controller is used for sequentially operating a number of different valves in a lawn sprinkling system. The valves are solenoid operated, the coils of the solenoids being illustrated at 500 in FIG. 1. For purposes of illustration, ten different coils 512 through 521 are shown in FIG. 1. The solenoids are conventional solenoid operated control valves well known in the art.

The controller includes a selection means 200, a programming means 100, a timing means 300, and a compare means 400, along with a power supply 10 and a programmer 12.

Refer now in particular to the selection means 200. The selection means 200 applies the control signals to the solenoid coils 500, one by one. The selection means 200 has a separate output circuit for each of the ten solenoid coils 500. The output circuits of the selection means 200 are taken at the contacts of a commutator 210. The commutator 210 has eleven contacts, 211 through 221. The contact 211 is actually a home position for the commutator, the purpose of which is explained hereinbelow. The contacts 212 through 221 are connected to one end of the solenoid coils 512 through 521, respectively. The opposite ends of the coils from the commutator 210 are connected in common to the ouput circuit of a power supply 10. The power supply 10 applies a 24 volt alternating current signal to the solenoid coils 500. Whenever one of the solenoid coils 500 is to be energized and cause water to flow through the corresponding solenoid valve to the water sprinkling system, the selection means 200 couples the particular solenoid coil to ground, causing current to flow from the power supply 10 through the solenoid coil.

The commutator 210 is a switching device and has a rotatably mounted brush assembly 222 having three electrical brushes 222a. The contacts 211 through 221 are positioned in a circular pattern so that one of the brushes 222a makes electrical contact with each of the contacts as it sweeps around in a circular path. The commutator 210 has two circular electrical conductors 223 and 224. The circular conductors 223 and 224 form a continuous electrical path in such a position that the other two brushes 222a of the brush assembly 222 make electrical contact therewith as the assembly 222 sweeps about in a circular path making contact with the contacts 211 through 221. The brushes 222a are electrically connected together in the assembly 222 thereby causing the contacts, and rings 223 and 224, to be shorted together. The circular contact 223 has a segment removed therefrom so that the brush assembly 222 arrives at a position halfway between the contacts 211 and 212 before electrical contact is made between the conductor 223 and the corresponding brush 222a.

It should now be evident that the commutator 210 may be constructed in any one of a number of different forms well known in the computer art. For example, the commutator 210 may be composed of a wafer switch having three wafers and corresponding thereto three electrical brushes which are shorted together, one wafer being provided for the contacts 211 through 221, another wafer being provided for the conductor 223 and another wafer being provided for the conductor 224. However, in a preferred embodiment of the present invention, the commutator 210, and the programming means 100 and compare means 400, comprise a printed circuit board as shown and described in a co-pending application entitled Switching Apparatus filed in the name of Burnie M. Craig on June 15, 1964 and bearing the Ser. No. 375,118.

The selection means 200 includes a selection motor 201. The selection motor 201 has an output shaft 201a which is mechanically coupled to the brush assembly 222. The mechanical interconnection is illustrated by dashed lines in FIG. 1. The selection motor 201 is a conventional timing motor which rotates its output shaft 201a at the rate of two revolutions per minute. In a preferred embodiment of the present invention, the selection motor 201 is of the type manufactured by the Hansen Manufacturing Company, Inc. located in Princeton, Ind., and identified as a Synchron timing motor.

The armature winding of the selection motor 201 is illustrated at 201b, and is connected between a conductor 240 and the output circuit of the power supply 10.

The selection means 200 also has a cam actuated switching mechanism operated from the shaft 201a. The cam actuated switch mechanism includes a cam actuated switch 230 having a pole 230a and contacts 230b and 230c. The pole 230a of the switch 230 is mechanically and rotatably coupled to a cam 232. The cam 232 is rotatably mounted and has eleven indentations 232a. The indentations 232a of the cam allow the pole 230a to be biased, by means of a spring bias mechanism 231, into electrical contact with the contact 230b, whereas the raised portions of the cam in between the indentations 232a cause the pole 230a to be forced into electrical contact with the contact 230c. The pole 230a is connected to ground (0 volts potential). The cam 232 is mechanically positioned with respect to the brush assembly 222 so that the indentations 232a allow the pole 230a to be spring biased into electrical contact with 230b whenever the brush assembly 222 is in contact with one of the electrical contacts 211 through 221. However, the cam 232 is arranged so that the pole 230a is forced into electrical contact with 230c whenever the brush assembly 222 is out of contact in between two of the contacts 211 through 221. It should also be noted that the electrical connection between the contact 230b and the pole 230a is broken before the connection is made between circular conductor 223 and the brush assembly 222. The mechanical connection between the shaft 201a and the cam 232 is illustrated by a dashed line in FIG. 1.

Refer now to the timing means 300. The timing means 300 is the primary timing mechanism for the controller shown in FIG. 1. The timing means 300 includes a timing motor 301 and a reset motor 302. The timing motor 301 is a .96 revolution per hour timing motor of the type manufactured by the above noted Hansen Manufacturing Company, Inc. and identified as a Synchron timing motor with a one way clutch. The one way clutch is illustrated in FIG. 1 at 301c and is positioned in between the motor and the output shaft 301a. The one way clutch 301c permits the shaft 301a to be driven or rotated at a higher speed than the rotor of the motor. The output shaft 301a of the timing motor 301 is connected to an output shaft 312 of the timing means 300. The connection between 301a and 312 is illustrated by dashed lines in FIG. 1. Actually the shafts 301c and 312 may be the same shaft. The shaft 312 is rotatably coupled to a brush assembly 412 of a commutator 410 in the compare means 400. Coupled to the output shaft 312 is a gear 310 having teeth which engage the teeth of another gear 311. The gears 311 and 312 have a 1 to 1 gear ratio.

The reset motor 302 is of the type manufactured by the above noted Hansen Manufacturing Company, Inc. and referred to as a synchron timing motor with a one way clutch. The reset motor 302 is quite similar to the timing motor 301 except that it rotates its output shaft at a much higher speed of five revolutions per minute rather than .96 revolution per hour. The one way clutch is illustrated at 302c in FIG. 1. The output shaft 302a of the reset motor is mechanically and rotatably connected to the gear 311.

The armature windings of the timing motors 301 and 302 are illustrated at 301b and 302b, respectively. The armature windings 301b and 302b have one end thereof connected in common to the power supply 10 whereas the opposite end of the windings 301b and 302b are connected to the conductor 223 of the commutator 210 and a contact 420b in the compare means 400, respectively.

When the armature winding 301b of the timing motor is energized, it causes the timing motor 301 to drive its output shaft 301a causing the output shaft 312 to be rotated in synchronizm therewith and provide an indication of elapsed time. The elapsed time indication is provided due to the change in angular position of the shaft 312. While the shaft 312 rotates, the gear 310 is rotated causing the gear 311 to rotate. However, due to the one way clutch 302c, the shaft 301a is free to rotate without rotating the rotor of the reset motor 302.

The armature winding 302b of the reset motor is energized when the armature winding 301b of the timing motor is de-energized. When the armature winding 302b is energized it causes the output shaft 301a to rotate in the direction indicated in FIG. 1 rotating the gear 311 and 310 causing the output shaft 312 to be rotated at a much higher speed than is caused by the timing motor 301. The one way clutch 301c allows the gear 310 and the shaft 302a to rotate freely without rotating the rotor of the timing motor 301.

Refer now to the compare means 400. The compare means 400 has a commutator 410 which is constructed quite similar to the commutator 210. The commutator 410 has twelve electrical contacts which are referenced by symbols 0, 2½, 5, 10, 15, 20, 25, 30, 35, 40, 50 and 60 which correspond to minutes of elapsed time. A brush assembly 412 is provided and has two electrical brushes 412a, one of which makes electrical contact with the contacts of the commutator 410 as the brush assembly 412 is rotated. The commutator 410 includes a circular conductor 411 which is positioned so that one of the brushes 412a makes continuous electrical contact therewith. The brush assembly 412 provides a direct electrical connection between the brushes 412a and the conductor 411. The contacts of the commuator 410 are spaced apart so that the brush 412a breaks contact with one electrical contact before contact is made with the adjacent electrical contact.

A cam actuated switch 420 is provided. The cam actuated switch 420 is a conventional cam actuated switch which is well known in the switching art and has two electrical contacts 420b and 420c and an electrical pole 420a for making electrical contact with the contacts. A spring bias system 421 is provided for normally biasing the pole 420a into electrical contact with the contact 420b.

A cam 430 is rotatably coupled to the output shaft 312 (as indicated by dashed lines in FIG. 1) of the timing means 300. The cam 430 is formed and positioned relative to the brush assembly 412 so that whenever the brush 412 is in electrical contact with the 0 minute contact, a home position, the cam 430 causes the cam actuated switch 420 to be actuated with the pole 420a in electrical contact with 420c. Whenever the shaft 312 is rotated so that the brush assembly 412 is not in a home position, the cam 430 is rotated such that the pole 420a allows the spring bias mechanism 421 to bias the pole 420a into electrical contact with 420b. The contact 420c is connected to the circular conductor 411 of the commutator 410. The pole 420a is electrically connected to the contact 230c in the selection means 200.

Refer now in particular to the programming means 100. The programming means 100 is provided for storing an indication of the length of time a control signal is to be applied at each of the contacts 212 through 221 of the selection means 200. The programming means 100 comprises a switching matrix with ten different sections 101 through 110 corresponding to the contacts or output circuits of the selection means 200. The section 101 is connected between the contact 212 of the commutator 210 and each of the contacts of the commutator 410. The section 101 includes a manually settable switch which allows an operator to establish a connection between the contact 212 and one of the contacts of the commutator 410 according to the length of time the user wants the solenoid coil, corresponding to the contact 212, to receive a control signal. For example if a control signal is to be applied at the contact 212 for 50 minutes the section 101 is set so that a connection is established between the contact 212 and the contact 50 of the commutator 410.

FIG. 2 is a schematic diagram illustrating the connection between the contact 212 and the contacts of the commutator 410. As indicated, the contact 212 is connected by means of a conductor 101a to one of twelve output conductors of the switching circuit 101, the output circuits being referenced by the symbols 101-1 through 101-12. The output conductors 101-1 through 101-12 of the switching circuit 101 are connected to the contacts 0, 2½ through 60, respectively, of the commutator 410.

Each of the other switching circuits 102 through 110 of the programming means 100 is schematically the same as the switching circuit 101 but in contrast to 101 are connected to the contacts 213 through 221. Similar to the switching circuit 101, the output circuits of the switching circuits 102 through 110 include twelve output circuits which are connected to the contacts 0 through 60 of the commutator 410. In this manner a separate program time can be established for the control signal at each of the contacts of the commutator 210.

It will now be evident that the programming means 100 may be composed of rotary switches, or commutators, one for each of the circuits 101 through 110 or other similar switching circuit or circuits. A preferred embodiment of the programming means comprises a printed circuit board as disclosed in the above-noted copending patent application entitled Switching Apparatus filed in the name of Burnie M. Craig.

A selector switch 600 is provided for selecting the mode of operation of the controller. For example, when the selector switch 600 is in the position indicated in FIG. 2, an electrical connection is established between the conductor 240 and a contact 601 of the switch 600. The contact 601 is connected to the conductor 411 and the contact 420c. When the selection switch 600 is in the position indicated, the controller is in an automatic mode of operation the details of which will be explained hereinafter. The selection switch 600 also has other positions. For example, when the switch 600 is positioned in contact with 602 the controller will not go through its control cycle of operation allowing the user to control the watering system manually. The automatic operation of the controller is of concern herein and only the automatic operation is described in detail.

The programmer 12 is provided for starting each watering cycle automatically. The programmer 12 is a conventional program selector which allows the user to initiate a watering cycle one or more times during a day as desired. The programmer 12 is preferably of the type manufactured by the Tork Time Controls, Inc. located in Mount Vernon, N.Y., and identified as the 8000 series program selector. For purposes of illustration, a switch 12a is shown in FIG. 1 in the programmer 12 for initiating the operation of the controller.

Consider now the operation of the controller. The operation of the controller can be initiated by either actuating a start switch 700 or by actuating the switch 12a in the programmer 12 which in either case causes an electrical connection to be established between the conductor 240 and ground via the home contact 211, the brush assembly 222, the circular conductor 224, the contact 230b and the pole 230a. After the operation of the controller has once been initiated, four basic timing cycles take place: First, the brush assembly 222 is moved into contact with one of the electrical contacts 212 through 221 of the commutator 210. Second, the timing motor 301 is energized causing the reference member or output shaft 312 to provide an indication of elapsed time corresponding to the time that a control signal is being applied at a contact of the commutator 210. Third, after the time specified by the setting of the programming means 100 has elapsed, the brush assembly 222 is moved off of the contact of the commutator 210 and is positioned in between that contact and the adjacent contact. Fourth, the reset motor 302 is energized causing the output shaft 312 and the brush assembly 412 to be rapidly reset to a home position.

Consider these operations in detail. Consider first of all the first timing cyle. Assume that a connection has been established between the conductor 240 and ground by either the switch 700 or the programmer 12. The connection is maintained long enough to allow the armature winding 201b to cause the motor 201 to move the brush assembly 222 to a position in between the contacts 211 and 212 and cause the cam 232 to actuate the switch 230 and cause the pole 230a to form an electric contact with the contact 230c. This establishes a ground connection to the conductor 240 via the switch 600, the contact 420c, the pole 420a, the contact 230c and the pole 230a. Once this connection is established the coil 201b is continuously energized until the brush assembly 222 has rotated into electrical contact with the contact 212. At this point the cam 232 allows the pole 230a to again be moved into electrical contact with 230b.

The second timing cycle is now initiated wherein the timing motor 301 is energized. The armature winding 301b of the timing motor 301 now has one end connected to ground via the circular conductor 223, the brush assembly 222, the circular conductor 224, the contact 230b and the pole 230a. This causes the timing motor 301 to be energized and commence rotating the output shaft 312 at the rate of .96 revolution per hour. The solenoid coil 512 is connected to ground potential via the contact 212, the brush assembly 222, the circular conductor 224, the contact 230b and the pole 230a causing the solenoid coil to be energized and the corresponding solenoid valve to be actuated allowing the flow of water therethrough.

Assume that the switching circuit 101 of the programming means 100 is set so that a control signal is to be applied to the contact 212 for 50 minutes. With ground potential connected to the contact 212, the switching circuit 101 connects the ground potential thereat to the contact 50 of the commutator 410. Returning again to the second cycle of operation, the timing motor 301 continues operation rotating the output shaft 312 and the brush assembly 412 until an electrical connection is established thereby with contact 50. At this point the armature winding 201b is connected to ground via the conductor 240, the switch 600, the conductor 411, the brush assembly 412, the contact 50 of the commutator 410, switching circuit 101 of the programming means 100, the commutator 210 and the switch 230.

At this point the third cycle of operation is commenced wherein the brush assembly 222 is moved to a position intermediate two contacts. To this end, the energized armature winding 201b causes the select motor 201 to rotate the output shaft 201a and the brush assembly 222 until the cam 232 causes the pole 230a to be moved into electrical contact with 230c. At this point ground connection is broken to the winding 201b by the switch 230 and the brush 222 is out of contact with any of the contacts of 210. However, during the second cycle when the timing motor 301 rotated the shaft 312, the cam 430 was also rotated allowing the pole 420a to be moved into electrical contact with 420b. With the pole 230a in electrical contact with 230c, an electrical connection is established to the armature winding 302b of the reset motor 302 via the switch 420 and the switch 230. This causes the reset motor 302 to be energized causing the output shaft 302a to be rotated at a fast reset speed of five revolutions per minute until the output shaft 312 is rotated back to its initial or home position with the brush assembly 412 in electrical contact with the 0 or home contact.

When the shaft 312 is positioned in a home position, the cam 430 is again positioned so that the pole 420a is forced into electrical contact with 420c. In this position, the armature winding 201b is again connected to ground via the conductor 240, the switch 600, the switch 420 and the switch 230. It will now be recognized that this is the beginning of the first cycle of operation. Thus, the winding 201b of the select motor is energized again and causing the brush assembly 222 to be rotated into electrical contact with the contact 213. The operation described hereinabove is repeated for each contact of the commutator 210 until the brush assembly 222 is returned to its home position in electrical contact with the home contact 211.

It will be evident to those skilled in the art that a preferred embodiment of the invention is disclosed but that there are a number of different ways in which the control apparatus of the present invention may be constructed still within the scope of the following claims. For example, the commutators 210 and 410 may be replaced by relay networks which operate sequentially, without the need for motors. Also relays may be used in place of the cams and cam actuated switches for the same function.

It will also be noted that power to the solenoid coils 500 is applied and removed by the cam actuated switch 230. This is important as it allows the commutators 210 and 410 to be constructed with low current switching capabilities and thereby reduce the cost of the commutators 210 and 410. It will also be noted that the cams and associated cam actuated switches operating in conjunction with the commutators distinguish the four timing cycles.

What is claimed is:

1. Control apparatus the combination comprising selection means having a plurality of output circuits at which timed control signals are sequentially applied and removed, one by one, said selection means comprising a rotary switch means having a plurality of contacts and a brush for making electrical contact with said switch contacts, motor means for rotating said brush causing electrical contact to be sequentially made and broken with said contacts, said selection means additionally comprising at least one cam actuated switch coupled to said brush and adapted to be actuated after said brush is in electrical contact with one of said contacts and apply a control signal thereto, timing means including a reference member, timing motor means mechanically coupled to the reference member and operative for rotating the reference member and thereby cause the member to provide an indication of elapsed time from a reference position of the member, reset motor means mechanically coupled to the reference member and operative for causing said reference member to be reset to said reference position and clutch means coupled between the timing motor means and the reference member to permit said reference member to be reset; programming means coupled to said selection means and operative for providing a separate indication of the desired time a signal is to be applied at each of said output circuits; and means for applying a control signal to said selection means including compare means coupled to said reference member and programming means and adapted for applying a control signal to said selection means in response to a coincidence between the programmed time for a particular one of said plurality of output circuits and the elapsed time indicated by said reference member causing the timed control signal to be removed from the output circuits of said selection means.

2. Control apparatus the combination comprising timing means for providing an indication of elapsed time including controllable reset control means for rapidly resetting said timing means to an initial condition; selection means including switch means having an input circuit and a plurality of output circuits and adapted for coupling control signals from said input circuit to the output circuits and motor means coupled to said timing means and operative for causing said switching means to advance the coupling from one output circuit thereof to the next concurrently with the resetting of said timing means, and cam actuated switch means coupled to said switch means and adapted for applying a control signal to said input circuit after said input circuit is coupled to one of said output circuits; programming means coupled to said selection means and operative in response to a control signal at each one of said output circuits for providing an indication of the time interval such control signal is to be applied thereat; and compare means coupled to be responsive to a coincidence of elapsed time indicated by the programming means and reset control means for causing said reset means to rapidly reset said timing means.

References Cited
UNITED STATES PATENTS

| | | | |
|---|---|---|---|
| 3,027,506 | 3/1962 | Stenhammar et al. | 307—141.8 XR |
| 3,140,720 | 7/1964 | Griswold. | |
| 3,227,821 | 1/1966 | Hauser | 307—141 XR |
| 3,234,410 | 2/1966 | Sherman | 307—141.8 |

ORIS L. RADER, *Primary Examiner.*

T. B. JOIKE, *Assistant Examiner.*

UNITED STATES PATENT OFFICE

CERTIFICATE OF CORRECTION

Patent No. 3,351,785　　　　　　　　　　November 7, 1967

Burnie M. Craig et al.

It is hereby certified that error appears in the above numbered patent requiring correction and that the said Letters Patent should read as corrected below.

In the heading to the printed specification, lines 4 and 5, for "Campus Road Investment Company, Inc." read -- Thompson Manufacturing Company --.

Signed and sealed this 12th day of November 1968.

(SEAL)
Attest:

Edward M. Fletcher, Jr.　　　　　　　　　　EDWARD J. BRENNER
Attesting Officer　　　　　　　　　　　　　Commissioner of Patents